E. F. STRATTON.
CAMERA.
APPLICATION FILED JULY 18, 1913. RENEWED DEC. 2, 1914.

1,148,127.

Patented July 27, 1915.
2 SHEETS—SHEET 1.

Witnesses:
Harry C. Heebig
Minnie S. Miller

Edmond F. Stratton Inventor
By his Attorneys
Ashley & Cohen

UNITED STATES PATENT OFFICE.

EDMOND F. STRATTON, OF NEW YORK, N. Y., ASSIGNOR TO GORDON CAMERA CORPORATION, A CORPORATION OF NEW YORK.

CAMERA.

1,148,127.  Specification of Letters Patent.  Patented July 27, 1915.

Application filed July 18, 1913, Serial No. 779,722. Renewed December 2, 1914. Serial No. 875,184.

*To all whom it may concern:*

Be it known that I, EDMOND F. STRATTON, a citizen of the United States, and a resident of New York city, borough of Brooklyn, in the county of Kings and State of New York, have invented certain new and useful Improvements in Cameras, of which the following is a specification.

This invention relates to cameras, particularly cameras in which pictures may be taken on cards or ferrotypes, the latter developed and fixed without removing the same from the confines of the walls of the camera.

The objects of the invention are directed to improvements in the camera disclosed and claimed in my co-pending application Serial Number 755,713, filed March 20, 1913.

One of these objects is to provide a camera of this character with means whereby it may be readily focused.

Another object is to provide means for projecting the image upon a translucent screen which may be observed by the operator to determine the sharpness of the outline of the image.

Still further objects and advantages will more fully appear from the detailed description and the features of novelty will be particularly pointed out in the claims.

Figure 1:
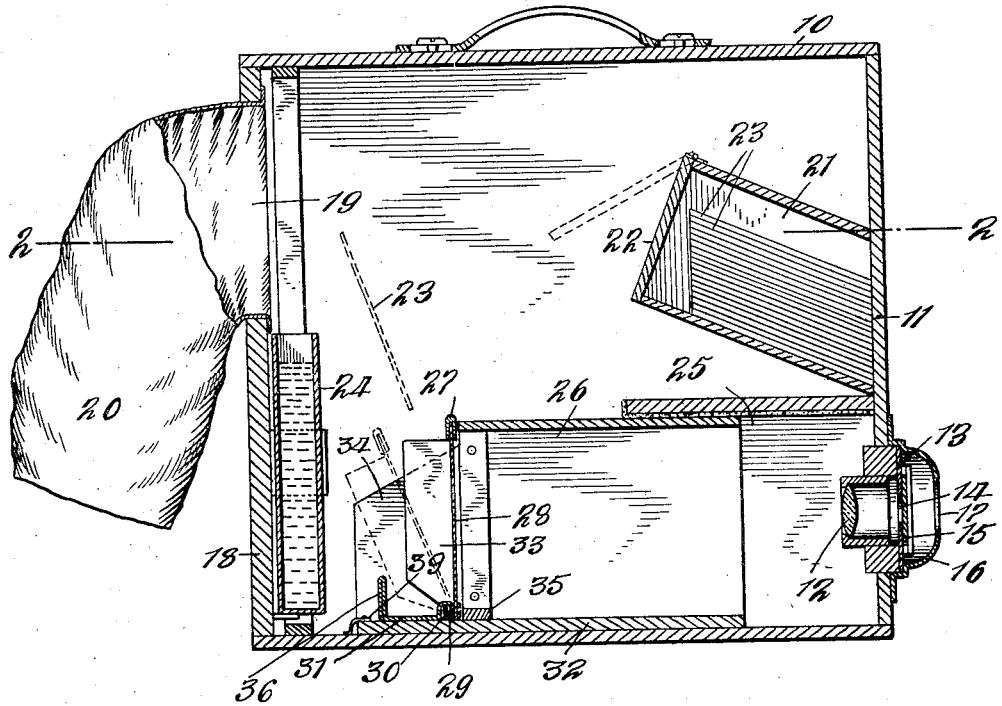
Figure 2:
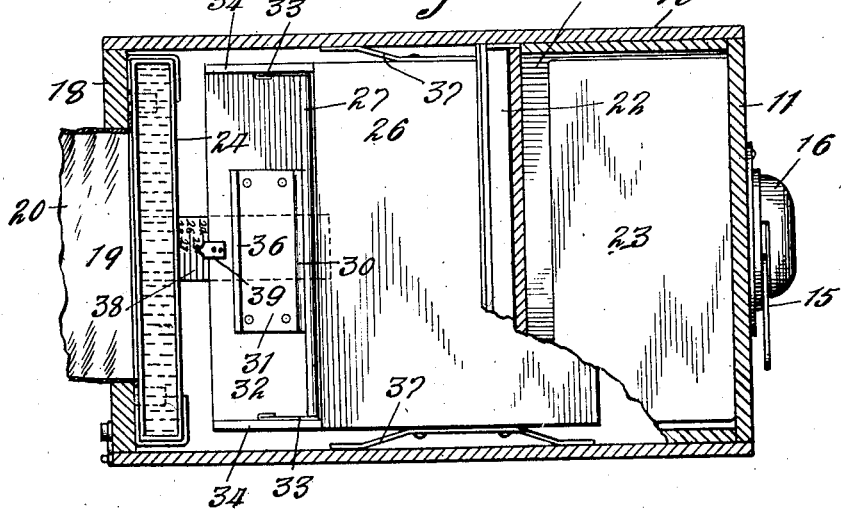
Figure 3:
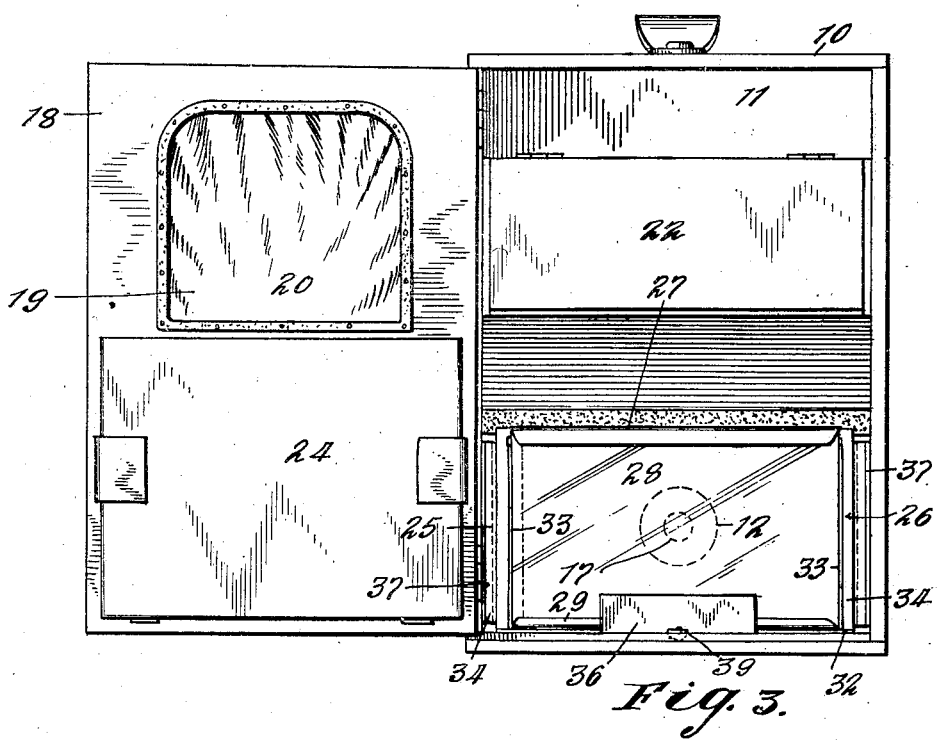

In the drawing illustrating this invention, Figure 1 is a longitudinal sectional elevation of an improved camera. Fig. 2 is a section taken on line 2—2 of Fig. 1. Fig. 3 is a rear end elevation illustrating the interior of the camera, the door being open.

Referring in detail to the drawings, the casing 10 of the camera is formed with an end wall 11, in which is suitably mounted the objective 12. A diaphragm 13, having a central aperture 14 is disposed exteriorly of the objective and this aperture may be opened and closed by the usual shutter 15. A suitable casing 16, having an opening 17 on a line with the aperture 14 may inclose the diaphragm and shutter to protect the same and also affording a finished appearance therefor.

The casing is closed by a door 18 having an aperture 19 formed therein, through which the hand of the operator may be inserted to perform the various operations within the camera. For excluding the light from the camera, this aperture is formed with a sleeve 20 of some opaque, flexible substance, suitably attached to the wall of the aperture. The casing is provided at the interior thereof with a magazine 21 having a swinging door 22, containing the cards or plates 23. From this magazine, a card or plate is readily removed and placed in the framing device and exposed and then immersed in the tank 24, containing the developing solution. This tank is mounted preferably upon the interior of the door 18, and when the latter is opened, the developed negative may be readily removed from the tank. The construction so far described is essentially the same as the construction in my co-pending application above referred to.

I will now describe the improved means whereby the negative is held in place and the means for focusing the image and observing the same upon the screen.

About the objective is formed a chamber 25 opening inwardly and telescoped within this chamber is a sliding compartment 26 opening into the chamber. At the rear end of the compartment 26 is mounted a frame 27 formed preferably of sheet metal and bearing a translucent screen 28, preferably consisting of a strip of celluloid or some such translucent, non-frangible substance. The frame 27 may be pivoted on an upturned hook portion 29, formed at the bottom thereof, engaging a downturned hook portion 30, which may be formed upon a plate 31 fastened to the bottom piece 32 of the compartment 26. The frame may also be provided with wings 33 extending from each side edge thereof and engaging the upstanding walls 34 of the compartment. These wings, by their inherent resiliency, press against these walls and thus frictionally hold the frame in the desired position of adjustment. Thus, when this frame is moved into the position indicated in dotted lines in Fig. 1, the strip of sensitized material may be dropped between it and an abutment 35 formed at the adjacent end of the walls of the compartment and the frame may thereupon be swung back to hold the strip in place for exposure.

The focusing of the image on the screen is accomplished as follows:—The plate 31, attached to the bottom piece 32 of the compartment, is formed with an upstanding finger piece 36 which may be grasped by the operator to move the compartment into any desired position of adjustment with reference to the objective. This adjustment may be accomplished when the door 18 is open. Springs 37, attached to the interior of the side walls of the compartment, bear against the interior of the walls of the casing and frictionally hold the compartment in adjusted position. The operator may, through the open door, view the image upon the translucent screen 38 and when the desired sharpness is obtained, he knows that the frame is in focus. He may then close the door and manipulate the card or plate to expose the same, as previously described. If desired, a scale 38 may be attached to the bottom of the casing and a pointer 39 fixed to the rear edge of the bottom piece 32 for the purpose of adjusting the frame without referring to the screen. However, in most cases, it will be found convenient to use the screen, as this always gives the most accurate adjustment.

Having thus described my invention, I claim as new and desire to secure by Letters Patent:

1. In a camera, a casing having an aperture through which the hand of the operator may be inserted, means for excluding light from this aperture, an objective, and a framing device for the sensitized strip comprising an abutment and a translucent movable member adjacent to the abutment whereby the strip is held in position for exposure, said translucent member serving as a screen upon which the image may be projected and viewed previous to exposing the strip.

2. In a camera, a casing having an aperture through which the hand of the operator may be inserted, means for excluding light from this aperture, an objective, and a framing and focusing device for the sensitized strip comprising a sliding compartment having an abutment and a translucent movable member adjacent to the abutment whereby the strip is held in position for exposure, said translucent member serving as a screen upon which the image may be projected and viewed previous to exposing the strip.

3. In a camera, a casing having an aperture through which the hand of the operator may be inserted, means for excluding light through this aperture, an objective, and a framing device for the sensitized strip comprising an abutment, and a movable member provided with spring wings at its lateral edges frictionally contacting a relatively stationary part, said member being adapted to hold the sensitized strip against the abutment in position for exposure.

4. In a camera, a casing having an aperture through which the hand of the operator may be inserted, means for excluding light through the aperture, an objective, and a framing device for the sensitized strip comprising an abutment, a movable frame having lateral wings contacting a relatively stationary part, a translucent screen within the frame whereon the image may be projected and viewed, said frame serving to hold the sensitized strip against the abutment.

5. In a camera, a casing, an objective, and a framing and focusing device for the sensitized strip comprising a chamber within the casing extending inward about the objective, a compartment telescoped within the chamber and movable relative thereto, means for holding the sensitized strip to the compartment in position to be exposed, and means whereby the hand of the operator may be inserted within the casing for manipulating the sensitized strip and excluding light therefrom.

6. In a camera, a casing, an objective, and a framing and focusing device for the sensitized strip comprising a chamber within the casing extending inward about the objective, a compartment telescoped within the chamber and movable relative thereto, a pivoted frame for holding the sensitized strip to the compartment in position to be exposed and means whereby the hand of the operator may be inserted within the casing with the exclusion of light to manipulate the sensitized strip.

7. In a camera, a casing, an objective, and a framing and focusing device for the sensitized strip comprising a chamber extending inward about the objective, a compartment telescoped within the chamber and movable relative thereto, and a pivoted frame comprising a translucent screen for holding the sensitized strip to the compartment in position to be exposed.

8. In a camera, a casing, an objective, and a framing and focusing device for the sensitized strip comprising a chamber extending inward about the objective, a compartment telescoped within the chamber and movable relative thereto, means for holding the sensitized strip to the compartment in position to be exposed, means for frictionally holding the compartment in adjusted position, and means whereby the hand of the operator may be inserted within the casing excluding light therefrom to manipulate the sensitized strip.

9. In a camera, a casing having a door in the rear end thereof provided with an aperture through which the hand of the operator may be inserted, means for excluding light through said aperture, an objective, a chamber extending inward about the objective, a movable extension of the chamber telescoped therein and slidable relatively thereto, means for frictionally holding said extension in adjusted position, a framing device for a sensitized strip mounted upon the chamber extension, said framing device comprising a translucent screen upon which the image may be focused and viewed previous to the insertion of the sensitized strip in position to be exposed.

10. In a camera, a framing device for the sensitized strip comprising an abutment, a frame pivotally mounted adjacent the abutment, said frame having means for frictionally engaging a relatively stationary part and formed with an upwardly turned hook at its bottom, and a member having a downwardly turned hook engaging said first mentioned hook to form a pivot for the frame, said frame being adapted to hold the sensitized strip against the abutment in position to be exposed.

Signed at New York city, in the county of New York, and State of New York, this 16th day of July A. D. 1913.

EDMOND F. STRATTON.

Witnesses:
MINNIE S. MILLER,
FRANK M. ASHLEY.